United States Patent Office 3,148,222
Patented Sept. 8, 1964

3,148,222
OXYCHLORINATION OF BENZENE IN THE PRESENCE OF CuCl₂/LiCl CATALYSTS
Siegfried E. Penner and Alvis Lewis Malone III, Wichita, Kans., assignors to Frontier Chemical Company, Division of Vulcan Materials Company, Wichita, Kans., a corporation of New Jersey
No Drawing. Filed Feb. 21, 1962, Ser. No. 174,705
5 Claims. (Cl. 260—650)

This invention relates to the production of halogenated aromatic hydrocarbons. More particularly, it relates to an improvement in the oxychlorination of benzene employing gaseous hydrogen chloride as a source of chlorine.

The oxychlorination of hydrocarbons using gaseous hydrogen chloride as a chlorinating agent is well known. In such a process gaseous hydrogen chloride, an oxygen containing gas such as air or pure oxygen, and the hydrocarbon to be chlorinated are passed in contact with a metal halide catalyst such as copper chloride on alumina. This type of oxychlorination process is well documented in the patent literature especially as applied to lower aliphatic hydrocarbons such as methane, ethane or ethylene, which compounds react quite readily at suitable temperatures. Indeed, the aliphatic hydrocarbons react so readily that avoidance of "hot spots" in the catalyst bed and other problems related to adequate temperature control have been among the technical difficulties to which the art has heretofore principally addressed itself. By contrast, attempts to use the usual oxychlorination technique and catalysts for chlorinating aromatics have generally proved disappointing in terms of hydrocarbon conversion. HCl conversion as well as selectivity to the desired chlorinated end product. Rather than moderating the catalyst by dilution with an inert diluent as has been heretofore proposed in the oxychlorination of aliphatic hydrocarbons, there is an apparent need to promote the activity of the typical oxychlorination catalysts when treating aromatic hydrocarbons in order to be able to operate satisfactorily at lower temperatures.

It is an object of the present invention to provide an improved process for oxychlorinating aromatic hydrocarbons in vapor phase. Another object is to provide an improved catalyst for use in the oxychlorination of aromatics. Still another object is to provide a process capable of producing the specifically desired chlorinated hydrocarbons in attractive yields, with a minimum of by-products, and at relatively high conversions of the feed hydrocarbon and of the hydrogen chloride. These and other objects as well as the nature and operation of the invention will become more clearly apparent from the following description.

It has now been discovered that an aromatic hydrocarbon such as benzene can be efficiently converted to the corresponding nuclearly monochlorinated derivative by passing the feed hydrocarbon in vapor phase in admixture with hydrogen chloride and a molecular oxygen containing gas over a novel catalyst. This novel catalyst comprises cupric chloride and lithium chloride as its essential catalytic constituents which are deposited preferably on activated alumina though other porous inert solids such as silica gel, pumice or calcined diatomaceous earth may be useful as alternate supports. In contrast to the surprising promoting effect of lithium chloride, other alkali metal chlorides such as potassium chloride or sodium chloride actually have been found to have a poisoning effect on the oxychlorination of benzene.

The principal reaction involved in the oxychlorination of benzene can be represented by the following equation:

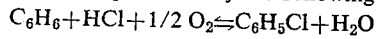

Referring to the above equation, it is generally desirable to use at least 20% excess, and preferably 40 to 140% excess air or oxygen over that theoretically required with respect to the hydrogen chloride fed into the reaction. In other words, it is desirable to employ feed mixtures containing 0.6 to 1.2 moles of molecular oxygen per mole of HCl, about 0.85 mole of molecular oxygen per mole of HCl being generally very satisfactory. It is likewise desirable to use a substantial excess of benzene in the feed mixture, mixtures containing about 4 to 10 moles per mole of HCl, being suitable for processing according to the present invention. As excess benzene in the feed mixture is reduced, benzene conversion shows a tendency to increase but is also usually accompanied by increased formation of the less desirable dichlorobenzenes as well as other side reactions.

The novel catalysts of this invention contain a compound of copper as the principal catalytic component and a compound of lithium as a catalyst promoter. Preferably, the catalysts are in the form of the corresponding metal chloride salts, i.e., CuCl₂ and LiCl. They can be conveniently prepared in an otherwise well known manner by impregnating particles of a common catalyst support with aqueous solutions of the metal salts and then drying. The copper chloride may be initially deposited on the catalyst support as cuprous chloride or as cupric oxychloride rather than as cupric chloride since either of the two first mentioned copper salts is promptly converted to cupric chloride when exposed to air or oxygen and hydrogen chloride at elevated temperatures. The copper chloride and the lithium chloride can be deposited on the catalyst support separately or from a mixed solution containing the two metal chlorides in proper proportions. Expressed in terms of the respective elemental metals the finished catalyst may contain about 0.1 to 3 gram atoms of lithium per gram atom of copper, 0.4 to 0.6 gram atoms of lithium per gram atom of copper being especially preferred. The total concentration of copper (expressed as CuCl₂) in the supported catalyst particles may range from about 1 to 20 weight percent based on the weight of the inert catalyst support.

The aqueous salt solutions used for impregnating the catalyst support may contain the desired salts in any suitable concentration, e.g., 20 to 60% of salt, and impregnation can be effected by mixing and stirring the catalyst support and impregnating solutions in proportions predetermined to give the desired catalyst composition. Usually it is most convenient to prepare a mixed solution containing the copper and lithium salts in the desired proportion and to impregnate the catalyst support with such a mixed solution. However, it is also feasible to impregnate the support first with a copper salt solution and then separately with a lithium salt solution and vice versa. The wet impregnated catalyst is dried in any convenient manner, e.g., in the open, in an oven at atmospheric pressure, or at reduced pressure. Drying at temperatures in the range of about 20° to 180° C. and at atmospheric pressure is illustrative of suitable drying conditions.

The preferred support is activated F-1 alumina. This is a well known commercial granular desiccant manufactured by the thermal treatment of rock-like granules of alpha alumina trihydrate. Typical properties of such an activated alumina are as follows: Al₂O₃ 92%; NaO 0.80%; Fe₂O₃ 0.12%; SiO₂ 0.99%; TiO₂ 0.01%; loss on ignition (1100° C.) 6.8%; surface area 210 sq. meter/g.; bulk density 50–55 lb./cu. ft.; specific gravity 3.3; crushing strength 55 (Alcoa method). It is a specially prepared, hard, stony, crystalline, non-friable, partially hydrated form of aluminum trioxide designated as "activated" alumina because of its active adsorptive properties. However, other conventional solid inorganic catalyst supports or even porous activated carbon such as "Columbia CXC" carbon, may also be used. Of course, carbon supports will undergo some combustion during the oxychlorination but this is not extensive when air is present in admixture with hydrogen chloride and benzene or the like.

The average particle size of the inert support is chosen in the usual manner to allow free passage of the reactant gases while providing a large contact area. Commonly, when using a fixed bed of catalyst, the particles are of a size to pass a 4 mesh screen and to rest on an 8 mesh screen (U.S. Sieve Series), though other sizes may be used. Alternately, finely divided, powdered catalyst may be used when it is desired to carry out the process employing the fluidizid solids technique according to otherwise well known principles.

Furthermore, the catalyst particles may be admixed with particles of inert diluent such as silicon carbide, graphite or corrosion resistant metals such as nickel, stainless steel or tantalum in order to aid in dissipating the heat of reaction from the catalyst bed and thus minimize temperature peaks in the reactor. However, unlike in the oxychlorination of aliphatics where the use of an inert catalyst diluent is usually of major importance, the use of such a diluent is generally unnecessary in the oxychlorination of aromatics when following the teachings hereof.

When the catalyst is employed as a fixed bed, the reactor is desirably in the form of a narrow tube or bundle of narrow tubes and made of corrosion resistant materials heretofore used in the art, such as Monel, nickel, stainless steel, Inconel, tantalum, and the like. Tubes having an internal diameter of about 0.75 to 1.25 inch are preferred but tubes having a larger diameter, e.g., 2 inches or more, can also be used. The necessary control over the reaction temperature can be conveniently maintained by use of a cooling jacket surrounding the catalyst tube or bundle of tubes and circulating a liquid heat exchange medium at a suitable rate and temperature through the jacket. The heat exchange medium may be either a stable organic compound such as biphenyl or an inorganic salt mixture of a suitably low melting point such as a mixture of $KNO_3$, $NaNO_2$ and $NaNO_3$. When operating with a fluidized bed of catalyst, temperature control can be achieved by circulating a portion of the catalyst back and forth between the reactor and a separate vessel wherein the circulating catalyst is cooled by contact with a cool gas such as air.

According to the present invention, the oxychlorination of benzene is carried out at a temperature between about 400° and 750° F., preferably at temperatures between about 450° and 600° F. At the lower temperatures water-white product is generally obtained. At the higher temperatures products showing a yellow tinge tend to be produced indicating some decomposition. However, the higher temperatures facilitate greater conversion and may therefore be preferred. The reaction pressure may be maintained in the range between about 0 to 150 p.s.i.g., preferably 40 to 80 p.s.i.g.

Total feed rates are desirably chosen such that the reaction mixture is allowed a superficial residence time in the catalyst bed of about 0.25 to 10 seconds, residence times of about 0.5 to 3 seconds generally being adequate. Optimum conditions can of course be readily determined in each case by routine preliminary tests.

The invention will now be further illustrated by specific working examples.

EXAMPLE 1

A $CuCl_2$-LiCl catalyst was prepared from C.P. grade chemicals as follows: 558 grams of $CuCl_2 \cdot 2H_2O$ and 115 g. of LiCl were dissolved in 980 ml. of water. The solution was added at room temperature to 2000 g. of 4–8 mesh activated alumina (Grade F-1, Aluminum Company of America). The amount of solution was such that most of it was absorbed by the alumina releasing enough heat to raise the temperature of the mixture to about 50° C. The mixture was stirred for about 30 minutes after the liquid was added in order to distribute the solution not immediately absorbed. The small amount of excess liquid was then removed by suction filtration. The filtered catalyst was transferred to an open evaporating dish and dried in an air oven at 130° C. for 21 hours. Upon analysis, the dried catalyst was found to contain 12.26 weight percent of $CuCl_2$ and 2.0 weight percent of LiCl.

The catalyst prepared as just described, was charged into a vertically disposed Monel tube 6.5 feet long and 1 inch in diameter to form therein a catalyst bed 5 feet in depth. The tube was screened and plugged so as to provide 6 inches on the top (inlet) end of the reactor tube free of catalyst. This top portion was charged with graphite particles and served to preheat the feed. The reactor tube was provided with a heat exchange jacket through which biphenyl (Dowtherm E) was circulated for heat control. A nitrogen system was used to control the pressure on the coolant, thereby controlling its boiling point. Electric heaters were wound around the outside of the jacket. Catalyst bed temperature was measured by a movable thermocouple in a well inside the catalyst bed extending along its entire length. Benzene was pumped into the reactor through a vaporizer. Hydrogen chloride and air were metered with rotameters, mixed, and passed into the top of the reaction tube where they first contacted benzene vapors. The reactor effluent was passed through condensers to liquefy most of the water and organic product, through a water scrubber to remove HCl, and through a wet test meter. Suitable gas sampling locations were provided.

When the reactor tube was heated to 460° F., a mixture of benzene, air and HCl was passed through the reactor at an average pressure of 6 p.s.i.g. and at the following feed rates:

| | G. mol/hr. |
|---|---|
| Benzene | [1] 31.3 |
| Air | [2] 29.8 |
| HCl | [3] 6.30 |

[1] (400% excess.)
[2] (100% excess.)
[3] (Limiting.)

The superficial residence time equalled 0.97 second based on volume of the empty reactor tube.

Measuring the temperature in the reactor tube at ½ foot intervals starting at the top of the catalyst bed, the following temperature profile was observed during the course of the reaction at steady state conditions:

| Distance from top of catalyst bed, ft.: | Temperature, ° F. |
|---|---|
| 0 | 415 |
| 0.5 | 472 |
| 1 | 514 |
| 1.5 | 525 |
| 2 | 514 |
| 2.5 | 496 |
| 3 | 489 |
| 3.5 | 478 |
| 4 | 470 |
| 4.5 | 464 |
| 5 | 464 |

The condensed water and organic product were weighed, the HCl titrated, and organic product and gases analyzed by gas chromatography.

The following results were obtained:

| | Percent |
|---|---|
| HCl conversion | 99.8 |
| Benzene conversion | [1] 16.2 |
| Product distribution, mole percent: | |
| Monochlorobenzene | 92.4 |
| p-and/or m-Dichlorobenzene | 5.9 |
| o-Dichlorobenzene | 1.7 |

[1] (1.2% of the converted benzene formed $CO_2$, the rest formed chlorinated products.)

The above run (Run 1) was repeated under substantially the same conditions except that the top half of the catalyst bed was diluted with graphite particles so that the concentration of catalyst bearing particles was 75 volume percent (Run 2). Whereas with 100% catalyst the HCl conversion was about complete, using the diluted catalyst the HCl conversion was reduced to 80%. In a second test period of Run 2, the air feed rate was reduced from 100% excess to 12% excess thereby further reducing HCl conversion to 57% which is 71% of the conversion obtained at 100% excess air, even though residence time was increased 15% by decreasing the air rate. The beneficial effect of providing a substantial excess of air is to be noted.

It is apparent from the foregoing that the process of the present invention is well adapted for the production of chlorobenzene by oxychlorination of benzene. Excellent HCl utilization, high selectivity to the monochlorinated product and satisfactory benzene conversion are obtained. Unconverted benzene may of course be readily recovered from the reaction product and recycled to the reaction.

EXAMPLE 2

Another set of runs was carried out using the apparatus described in Example 1. In one run (Run 3) a conventional catalyst composed of cupric chloride on activated alumina was used. In a comparative run (Run 4) a catalyst comprised of both cupric chloride and lithium chloride on activated alumina was used. In Runs 5 and 6 a catalyst comprising only lithium chloride on activated alumina, without any copper chloride, was used at two different feed rates.

The $CuCl_2$ catalyst used in Run 3 was prepared in substantially the same manner as described in Example 1 except that the following quantities of reagents were used: 684 g. of $CuCl_2 \cdot 2H_2O$, 1200 ml. water and 2448 g. F-1 alumina. The catalyst was air dried at room temperature for one day.

The $CuCl_2$-LiCl catalyst used in Run 4 was prepared in exactly the same manner as described in Example 1 except that it was oven dried at 160° C. for 19 hours.

The LiCl catalyst used in Run 5 was prepared like the others using 220 g. of LiCl, 490 ml. of water and 1000 g. of F-1 alumina. This catalyst was dried at 110° C. for 15.5 hours.

The operating conditions and results obtained are summarized in Table I.

*Table I*

PROMOTING EFFECT OF LITHIUM CHLORIDE ON COPPER CHLORIDE IN BENZENE OXYCHLORINATION

| Run No. | 3 | 4 | 5 | 6 |
|---|---|---|---|---|
| Catalyst Bed: | | | | |
| Active Catalyst— | | | | |
| Support | Alumina * | | | |
| Wt. percent $CuCl_2$ | 13.0 | 12.4 | None | None |
| G.atoms Cu/1,000 g. Cat. | 0.967 | 0.924 | None | None |
| Other Salt | None | LiCl | LiCl (alone) | |
| G. atoms Metal/1,000 g. Cat. | | 0.465 | 3.54 | |
| How Packed, Top to Bottom— | | | | |
| Ft. of Preheat (Graphite only) | 0.5 | 0.5 | 0.5 | 0.5 |
| Length, ft. (Vol. Percent Active Cat.) | 5(100) | 5(100) | 5(100) | 5(100) |
| Operating Conditions: | | | | |
| No-reaction Cat. Bed Temp., ° F. | 458 | 458 | 467 | 467 |
| Max. Run Temp., ° F. | 482 | 518 | 468 | 469 |
| Distance Max. Temp. from top of Cat., ft. | 5.0 | 1.5 | 1.5 | 1.5 |
| Ave. Pressure, p.s.i.g. | 7.3 | 5.5 | 9 | 0 |
| Superficial Residence Time, Sec. | 1.09 | 0.99 | 1.14 | 6.9 |
| Feed Rates, g. moles/hour: | | | | |
| HCl | 6.15 | 6.17 | 6.23 | 1.14 |
| Air | 29.6 | 29.6 | 30.1 | 6.7 |
| Benzene | 30.2 | 29.9 | 31.4 | 5.96 |
| Material Balances, Percent: | | | | |
| Carbon | 95.2 | 98.6 | 100.9 | 106.4 |
| Chlorine | 95.4 | 90.7 | 84.0 | 98.9 |
| Conversion, (Out Basis) Percent: | | | | |
| Benzene | 9.8 | 16.5 | .019 | .06 |
| HCl | 53.6 | 97.8 | .08 | .15 |
| Selectivity of Converted Benzene, Percent: | | | | |
| Chlorobenzenes, mono+poly | 99.9 | 99.7 | 68 | 33 |
| $CO_2$ | 0.10 | 0.30 | 32 | 67 |
| CO | Trace | Trace | 0 | 0 |
| RCl Product Dist., mole Percent: | | | | |
| Chlorobenzene | 93.1 | 92.0 | 100 | 100 |
| p- and/or m-Dichlorobenzene | 5.7 | 6.5 | | |
| o-Dichlorobenzene | 1.2 | 1.5 | | |

* Grade F-1 Activated Alumina, Aluminum Company of America.

The temperature profiles generated in the catalyst beds in Runs 3 and 4, and in the Blank Run, are shown in Table II below.

*Table II*

TEMPERATURE PROFILES

| Distance from Top of Catalyst Bed, ft. | Blank Run (No Feed) | Temperature, ° F. | |
|---|---|---|---|
| | | Run 3 ($CuCl_2$) | Run 4 ($CuCl_2$—LiCl) |
| 0 | 465 | 411 | 413 |
| 1 | 462 | 461 | 496 |
| 1.5 | 462 | 466 | 518 |
| 2 | 460 | 467 | 506 |
| 3 | 456 | 469 | 484 |
| 4 | 454 | 472 | 467 |
| 5 | 450 | 482 | 459 |

The temperature profiles of Runs 5 and 6 were virtually identical with the profile of the blank run shown in Table II, except that the temperature in the first foot of length of the catalyst bed ranged from about 425° F. at the top of the bed to about 465° F. at a distance one foot down from the top.

The results show that a 98% HCl conversion and a 16.5% benzene conversion were obtained with the $$CuCl_2\text{—}LiCl$$

catalyst while only a 54% HCl conversion and 10% benzene conversion were obtained with the $CuCl_2$ catalyst. The difference in catalyst activity is further pointed up by the temperature profiles generated in the catalyst beds. As shown in Table II, a vigorous reaction takes place in the first half of the $CuCl_2$-LiCl catalyst bed as indicated by the temperature peak of about 520° F. at a distance of 1.5 feet from the top of the bed. By contrast, with the $CuCl_2$ catalyst the temperature throughout the major portion of the bed is only a few degrees above the 460° F. temperature to which the reactor was preheated to begin with. Actually, the difference in activity of the two catalysts is even greater than reflected by the reported data since there was a somewhat higher pressure drop, and hence a 10% greater residence time, in Run 3 than in Run 4.

On the other hand, in Run 5 lithium chloride (alone) on alumina produced only a trace of chlorinated product and the temperature of the bed never rose above the blank or no-reaction temperature. The same was true even in Run 6 though this run was deliberately run at only about one-fifth of the original feed rates and the residence time was thereby increased to about five times that of the standard run. These results show conclusively that lithium chloride (alone) on alumina is not a catalyst for benzene oxychlorination.

EXAMPLE 3

A further set of runs was carried out using the apparatus described in Example 1. These runs illustrate the respective effects of lithium chloride, sodium chloride and potassium chloride on copper chloride catalyst in benzene oxychlorination. In Example 3 as in Run 2 of Example 1 the top 2.5 feet of the catalyst bed was composed of a mixture composed of 75 volume percent of active catalyst particles and 25 volume percent of graphite particles present as an inert diluent while only the bottom 2.5 feet of the bed was composed of 100% active catalyst without any diluent.

The $CuCl_2$-LiCl catalyst used in Run 7 was prepared from C.P. grade chemicals as follows: Two hundred seventy nine grams of $CuCl_2 \cdot 2H_2O$ and 56.5 g. of LiCl were dissolved in 490 ml. of water. The solution was added at room temperature to 1000 g. of 4–8 mesh activated alumina (Grade F–1, Aluminum Company of America). The amount of solution was such that most of it was absorbed by the alumina releasing enough heat to raise the temperature to about 50° C. The mixture was stirred for about 30 minutes after the liquid was added in order to distribute evenly the solution not immediately absorbed. The small amount of excess liquid was then removed by suction filtration. The catalyst was transferred to an open evaporating dish and dried in an oven at 130° C. for 18 hours.

The $CuCl_2$-NaCl catalyst of Run 8 was prepared exactly as was the $CuCl_2$-LiCl catalyst of Run 7 using the same quantities of reagents except that 72.2 g. of NaCl was used in place of 56.5 g. of LiCl. This catalyst was dried at 130° C. for 21 hours.

The $CuCl_2$-KCl catalyst (of Run 9) was prepared exactly like the $CuCl_2$-LiCl catalyst of Run 7 except that 1.5 times the quantities were used and 175 g. of KCl was employed instead of LiCl. It was dried at 130° C. for 4 days.

The reaction conditions and results are summarized in Table III.

*Table III*

EFFECT OF LiCl, NaCl, KCl ON COPPER CHLORIDE IN BENZENE OXYCHLORINATION

| Run No | 7 | 8 | 9 |
|---|---|---|---|
| Catalyst Bed: | | | |
| Active Catalyst | | | |
| Support | Alumina a | | 11.68 |
| Wt. percent $CuCl_2$ | 12.45 | 12.62 | 0.868 |
| G. atoms Cu/1000 g. Cat | 0.926 | 0.94 | KCl |
| Other Salt | LiCl | NaCl | 0.663 |
| G. atoms Metal/1,000 g. Cat | 0.413 | 0.64 | |
| Diluent | | Graphite | |
| How Packed, Top to Bottom— | | | |
| Ft. of Preheat (Diluent only) | 0.5 | 0.5 | 0.5 |
| Length, ft. (Vol. percent Active Cat.) | 2.5(75) | 2.5(75) | 2.5(75) |
| Length, ft (Vol. percent Active Cat.) | 2.5(100) | 2.5(100) | 2.5(100) |
| Operating Conditions: | | | |
| No-reaction Cat. Bed Temp., °F | 403 | 399 | 406 |
| Max. Run Temp., °F | 500 (Est.) | 410 | 414 |
| Distance Max. Temp. from Top of Cat., Ft | 0.7 | 2.0 | 1.0 |
| Ave. Pressure, p.s.i.g | 3.5 | 1.5 | 2.0 |
| Superficial Residence Time, Sec | 2.52 | 2.30 | 2.36 |
| Feed Rates, g. Moles/Hour: | | | |
| HCl | 2.48 | 2.48 | 2.49 |
| Air | 11.3 | 11.4 | 11.3 |
| Benzene | 10.8 | 10.7 | 10.8 |
| Material Balances, percent: | | | |
| Carbon | 102.0 | 94.8 | 97.5 |
| Chlorine | 97.1 | 101.4 | 75.3 |
| Conversion (Out Basis) percent: | | | |
| Benzene | 19.4 | 6.8 | 1.1 |
| HCl | 97.2 | 28.3 | 6.2 |
| Selectivity of Converted Benzene, percent: | | | |
| Chlorobenzenes, mono + poly | 99.6 | 100 | 100 |
| $CO_2$ | 0.4 | 0 | 0 |
| CO | 0 | 0 | 0 |
| RCl Product Dist., Mole percent: | | | |
| Chlorobenzene | 90.4 | 96.9 | 100 |
| p- and/or m-Dichlorobenzene | 7.5 | 2.5 | 0 |
| o-Dichlorobenzene | 2.1 | 0.5 | 0 | a Grade F-1 Activated Alumina, Aluminum Company of America.

In Run 7 employing the $CuCl_2$-LiCl catalyst the catalyst bed temperature reached a peak of about 480° F. approximately 1 foot down from the top of the bed. By contrast, in Runs 8 and 9 employing $CuCl_2$-NaCl and $CuCl_2$-KCl catalyst, respectively, the temperature profiles were quite flat without any noticeable peaks and the temperatures in neither case exceeded the range of 410 to 420° F. In fact, in the case of the $CuCl_2KCl$ catalyst, the temperature profile was virtually identical with the temperature profile obtained on the preheated reactor prior to the start of the run ("no reaction" temperature).

Table III shows that the LiCl promoted catalyst gave an HCl conversion of 97% as compared with HCl conversions of 28% and 6% for the $CuCl_2$-NaCl and the $CuCl_2$-KCl catalysts, respectively. Similarly, the benzene conversion of 19.4% obtained with the $CuCl_2$-LiCl catalyst compares with benzene conversions of only about 7% and 1% with the $CuCl_2$-NaCl and the $CuC_2$-KCl catalysts. In summary, whereas lithium chloride has been found to be a very desirable promoter for the copper chloride catalyst in the oxychlorination of benzene, other alkali metal chlorides show a strong poisoning effect on the reaction. This unique effectiveness of lithium chloride is especially surprising here since potassium chloride has been heretofore described by others as an effective promoter for copper chloride in the oxidation of aliphatic hydrocarbons such as methane, and sodium chloride is known to have been used heretofore as a promoter with copper chloride in the manufacture of chlorine from air plus HCl.

It will be understood that the foregoing description and examples have been given merely by way of illustration. Many variations and modifications may be made therein without departing from the scope or spirit of the invention pointed out in the appended claims.

We claim:
1. A process for chlorinating benzene which comprises contacting a mixture of benzene, hydrogen chloride and a molecular oxygen-containing gas in vapor phase under oxychlorination conditions with a catalyst comprising cupric chloride and lithium chloride in a proportion such that the molar ratio of lithium chloride to copper chloride is from 0.1 to 3 moles of LiCl per mole of $CuCl_2$, supported on an inert carrier the oxygen-containing gas being supplied in an amount equivalent to an excess of at least 20% oxygen over theory.

2. A process for chlorinating benzene which comprises contacting a mixture of benzene, hydrogen chloride and a molecular oxygen-containing gas in vapor phase in a reaction zone at a temperature between about 400 and 750° F. and a pressure between about 0 and 150 p.s.i.g. with a catalyst comprising cupric chloride and lithium chloride supported on activated alumina, said chlorides being present in the catalyst in a proportion of from 0.1 to 3 moles LiCl per mole of $CuCl_2$, said mixture comprising about 0.6 to 1.2 moles of molecular oxygen and about 4 to 10 moles of benzene per mole of hydrogen chloride, and recovering chlorobenzene from the reaction zone effluent.

3. A benzene chlorination process according to claim 2 wherein the catalyst comprises about 1 to 20 weight percent cupric chloride and, in addition, lithium chloride such that the molar ratio of lithium chloride to copper chloride is 0.4 to 0.6 mole LiCl per mole $CuCl_2$.

4. A process for making monochlorobenzene substantially water-white in color which comprises contacting a mixture of benzene, hydrogen chloride and a molecular oxygen-containing gas in vapor phase in a reaction zone at a temperature between about 450° and about 600° F. and a pressure between about 0 and 150 p.s.i.g. with a bed of catalyst consisting essentially of cupric chloride and lithium chloride supported on activated alumina, said cupric and lithium chlorides being present in a proportion corresponding to between about 0.4 to 0.6 gram atom of lithium per gram atom of copper, and recovering substantially water-white monochlorobenzene from the reaction zone effluent.

5. A process according to claim 4 wherein the reaction pressure is maintained in the range of about 40 to about 80 p.s.i.g.; wherein benzene, oxygen-containing gas and hydrogen chloride are introduced into the reaction zone in the proportion of about 4 to 10 moles of benzene and about 0.6 to 1.2 moles of molecular oxygen per mole of hydrogen chloride, and wherein the reaction mixture is passed through said catalyst bed at a rate corresponding to a superficial residence time of about 0.25 to 10 seconds.

References Cited in the file of this patent

UNITED STATES PATENTS

| 1,935,648 | Mares | Nov. 21, 1933 |
| 2,399,488 | Hearne | Apr. 30, 1946 |
| 2,827,502 | Loeser et al. | Mar. 18, 1958 |
| 2,966,525 | Steen | Dec. 27, 1960 |